United States Patent
Hu et al.

(10) Patent No.: US 11,288,514 B2
(45) Date of Patent: Mar. 29, 2022

(54) VIDEO PROCESSING METHOD AND DEVICE, AND STORAGE MEDIUM

(71) Applicant: BEIJING XIAOMI MOBILE SOFTWARE CO., LTD., Beijing (CN)

(72) Inventors: Jiagao Hu, Beijing (CN); Fei Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 198 days.

(21) Appl. No.: 16/693,376

(22) Filed: Nov. 25, 2019

(65) Prior Publication Data
US 2021/0081671 A1 Mar. 18, 2021

(30) Foreign Application Priority Data

Sep. 12, 2019 (CN) .......................... 201910867365.7

(51) Int. Cl.
G06K 9/00 (2006.01)
G06F 16/75 (2019.01)
G06K 9/62 (2006.01)

(52) U.S. Cl.
CPC ......... *G06K 9/00718* (2013.01); *G06F 16/75* (2019.01); *G06K 9/00765* (2013.01); *G06K 9/6267* (2013.01)

(58) Field of Classification Search
CPC .......... G06K 9/00718; G06K 9/00765; G06K 9/6267; G06K 9/00697; G06K 9/6277; G06F 16/75; H04N 21/23418; H04N 21/234; H04N 21/44; H04N 21/44008
See application file for complete search history.

(56) References Cited

U.S. PATENT DOCUMENTS

| | | | | |
|---|---|---|---|---|
| 7,334,191 B1* | 2/2008 | Sivan | ..................... | G11B 27/28 715/721 |
| 7,559,017 B2* | 7/2009 | Datar | ..................... | G06F 16/78 715/230 |
| 2001/0005430 A1* | 6/2001 | Warnick | ................. | H04N 17/00 382/173 |

(Continued)

FOREIGN PATENT DOCUMENTS

| | | | |
|---|---|---|---|
| CN | 101047795 A | 10/2007 | |
| CN | 105426829 A | 3/2016 | |

(Continued)

OTHER PUBLICATIONS

First Office Action of the Chinese application No. 201910867365.7, dated Apr. 30, 2021.

(Continued)

*Primary Examiner* — John B Strege
(74) *Attorney, Agent, or Firm* — Syncoda LLC; Feng Ma

(57) ABSTRACT

A video processing method includes: collecting a plurality of video frames sequentially from a to-be-processed video; classifying an image corresponding to each of the plurality of video frames to obtain a classification result; for each video frame, performing a temporal smoothing processing on the classification result for the image corresponding to the video frame, to determine at least one category associated with the video frame; and grouping the adjacent video frames of a same category into a video segment, to obtain a plurality of video segments.

18 Claims, 7 Drawing Sheets

(56) References Cited

U.S. PATENT DOCUMENTS

| | | | |
|---|---|---|---|
| 2007/0025615 A1* | 2/2007 | Zhou | H04N 5/147 382/173 |
| 2009/0244093 A1* | 10/2009 | Chen | G11B 27/28 345/620 |
| 2013/0259375 A1 | 10/2013 | Dunlop | |
| 2013/0282747 A1 | 10/2013 | Cheng et al. | |
| 2014/0037216 A1* | 2/2014 | Kumar | G06K 9/6249 382/197 |
| 2014/0307968 A1 | 10/2014 | Chattopadhyay | |
| 2015/0082349 A1* | 3/2015 | Ishtiaq | H04N 21/4884 725/40 |
| 2016/0154882 A1 | 6/2016 | Cheng et al. | |
| 2016/0275341 A1* | 9/2016 | Li | G06K 9/4642 |
| 2016/0335499 A1* | 11/2016 | Tsai | G06K 9/6269 |
| 2017/0024858 A1 | 1/2017 | St. Clair et al. | |
| 2017/0185846 A1 | 6/2017 | Hwangbo et al. | |
| 2017/0236290 A1 | 8/2017 | Sorkine Hornung et al. | |
| 2019/0087965 A1 | 3/2019 | Datta et al. | |
| 2020/0012864 A1 | 1/2020 | Hwangbo et al. | |

FOREIGN PATENT DOCUMENTS

| | | |
|---|---|---|
| CN | 106599789 A | 4/2017 |
| CN | 107016415 A | 8/2017 |
| CN | 107180074 A | 9/2017 |
| CN | 108229515 A | 6/2018 |
| CN | 108537102 A | 9/2018 |
| CN | 109086811 A | 12/2018 |
| CN | 109190482 A | 1/2019 |
| CN | 109196514 A | 1/2019 |
| CN | 109919122 A | 6/2019 |
| WO | 2016182665 A1 | 11/2016 |

OTHER PUBLICATIONS

Road detection based on scene structural knowledge and CRF, Sep. 30, 2016, Deng Yanzi, Lu Zhaoyang and Li Jing, entire document.

Supplementary European Search Report in the European application No. 19214642.1, dated Jul. 13, 2020.

Lee J, Reade W, Sukthankar R, et al. "The 2nd YouTube—8M Large-Scale Video Understanding Challenge[C]". Proceedings of the European Conference on Computer Vision (ECCV). mailed in 2018.

Abdulhussain S, Ramli A, Saripan M, et al. "Methods and challenges in shot boundary detection: a review[J]". mailed on Mar. 23, 2018.

Shou Z, Wang D, Chang S F. "Temporal action localization in untrimmed videos via multi-stage cnns[C]". Proceedings of the IEEE Conference on Computer Vision and Pattern Recognition. 2016: 1049-1058.

Second Office Action of the Chinese application No. 201910867365.7, dated Nov. 9, 2021.

\* cited by examiner

| Label sequence \ Frame number | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | Sky 0.7 | Sky 0.85 | Sky 0.1 | Sky 0.6 | Sky 0.5 | Sky 0.5 | Grassland 0.45 | Grassland 0.35 | Grassland 0.1 | Grassland 0.5 | Grassland 0.6 | Grassland 0.35 | Grassland 0.01 | Grassland 0.5 | Grassland 0.6 |
| 2 | Bird 0.2 | Bird 0.09 | Bird 0.4 | Bird 0.2 | Mountain 0.4 | Mountain 0.35 | Mountain 0.15 | Mountain 0.26 | Mountain 0.6 | Mountain 0.19 | Mountain 0.02 | Mountain 0.6 | Mountain 0.11 | Mountain 0.12 | Mountain 0.13 |
| 3 | Ocean 0.05 | Ocean 0.02 | Ocean 0.3 | Ocean 0.01 | Ocean 0.01 | Flower 0.1 | Flower 0.32 | Flower 0.33 | Flower 0.15 | Flower 0.3 | Flower 0.3 | Flower 0.02 | Flower 0.8 | Flower 0.3 | Flower 0.2 |
| 4 | Tree 0.02 | Tree 0.01 | Tree 0.08 | Tree 0.05 | Tree 0.02 | Tree 0.01 | Tree 0.05 | Tree 0.06 | Tree 0.02 | Tree 0.01 | Tree 0.04 | Tree 0.03 | Tree 0.01 | Tree 0.05 | Tree 0.01 |

FIG. 4

VIDEO PROCESSING METHOD AND DEVICE, AND STORAGE MEDIUM

CROSS-REFERENCE TO RELATED APPLICATION

This application claims priority to Chinese patent application No. 201910867365.7 filed on Sep. 12, 2019, the disclosure of which is hereby incorporated by reference in its entirety.

BACKGROUND

With the development of the video technologies and the popularization of networks, the number of video resources has been growing rapidly. An issue in the field of video technologies is to manage and classify a large number of videos, and accurately and comprehensively understand (for example, conveniently acquiring resources of interest of users) video content from the large number of videos.

SUMMARY

The present disclosure relates generally to the field of video understanding, and more specifically to a video processing method and device, and a storage medium.

According to a first aspect of the embodiments of the present disclosure, a video processing method is provided, which may include operations as follows. Multiple video frames are collected sequentially from a to-be-processed video. An image corresponding to each of multiple video frames is classified to obtain a classification result. A temporal smoothing processing is performed on the classification results for the images corresponding to the video frames, to determine at least one category associated with each of the video frames. The adjacent video frames of a same category are grouped into a video segment, to obtain multiple video segments. If a same video frame belongs to different categories, the video frame is categorized into different video segments of the categories corresponding to the video frame.

According to a second aspect of the embodiments of the present disclosure, a video processing device is provided, which includes: a processor, and a memory configured to store an instruction executable by the processor. The processor is configured to: collect multiple video frames sequentially from a to-be-processed video; classify an image corresponding to each of the multiple video frames to obtain a classification result; for each video frame, perform a temporal smoothing processing on the classification results for the images corresponding to the video frames, to determine at least one category associated with each video frame; and group the adjacent video frames of a same category into a video segment, to obtain multiple video segments. If a same video frame belongs to different categories, the video frame is categorized into different video segments of the categories corresponding to the video frame.

According to a third aspect of the embodiments of the present disclosure, a non-transitory computer readable storage medium is provided. When an instruction in the storage medium is executed by a processor of a mobile terminal, the mobile terminal performs a video processing method. The video processing method comprises: collecting a plurality of video frames sequentially from a to-be-processed video; classifying an image corresponding to each of the plurality of video frames to obtain a classification result; for each video frame, performing a temporal smoothing processing on the classification results for the images corresponding to the video frames, to determine at least one category associated with each video frame; and grouping the adjacent video frames of a same category into a video segment, to obtain a plurality of video segments. If a same video frame belongs to different categories, the video frame is categorized into different video segments of the categories corresponding to the video frame.

It should be understood that the above general descriptions and following detailed descriptions are only exemplary and explanatory rather than limiting the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

FIG. 4 is a schematic diagram of categorizing the multiple video frames into video segments according to a smooth tag sequence in the video processing method according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the present disclosure. Instead, they are merely examples of apparatuses and methods consistent with aspects related to the present disclosure as recited in the appended claims.

A video classifying and tagging method can be used to understand video content. With the video classifying and tagging method, a series of feature coding and sequence features are fused to determine a category of the entire video, and one or more category tags are given to the entire video. However, a video may cover a large number of categories of instances, and different categories of instances may be contained in any video segment. Therefore, the current video classifying and tagging method cannot classify different categories of instances in the video. In addition, with the current video classifying and tagging method, only the category of the entire video is given, and starting and ending time periods of multiple different categories of the instances in the video cannot be positioned.

Figure 1:
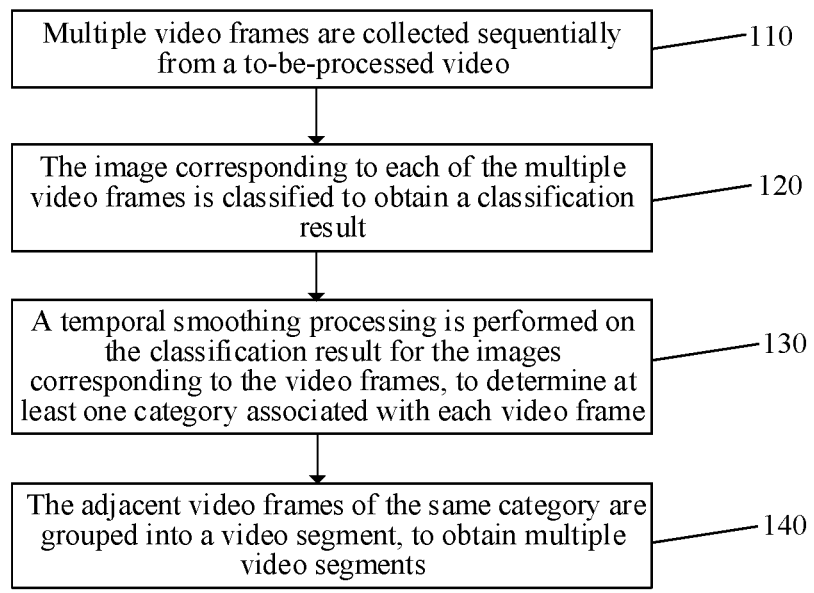
FIG. 1 is a flowchart of a video processing method according to some embodiments of the present disclosure.

FIG. 1 is a flowchart of a video processing method according to some embodiments of the present disclosure. As shown in FIG. 1, the method includes operations as follows.

In operation S110, multiple video frames are collected sequentially from a to-be-processed video.

In some embodiments of the present disclosure, when a video frame is collected sequentially from a to-be-processed video, multiple video frames may be collected at intervals from the to-be-processed video. In some embodiments of the present disclosure, a collecting frequency may refer to extracting a predetermined number of video frames from the to-be-processed video at intervals per second. For example, the predetermined number may be 2 to 5 frames. Other collecting frequency may be selected as needed.

After the video frames are collected according to some embodiments of the present disclosure, each of the collected video frames may be converted into an image corresponding to the video frame.

In operation S120, the image corresponding to each of the multiple video frames is classified to obtain a classification result.

In the embodiment of the present disclosure, an image classifier may be used to classify the image corresponding to each of multiple video frames. On the one hand, in some embodiments of the present disclosure, a certain number of images are collected and tagged, to train an image classifier. On the other hand, in some embodiments of the present disclosure, an existing image classifier may be selected. In some embodiments of the present disclosure, an existing image classifier may be selected according to actual application requirements. For example, in order to improve the accuracy, a large network such as Inception-Resnet, DenseNet, or NASNet may be selected. For another example, in order to deploy in a terminal device, a lightweight network such as Mobilenet or Shufflenet may be selected. Which image classifier is selected is not limited in the present disclosure.

In operation S130, a temporal smoothing processing is performed on the classification results for the images corresponding to the video frames, to determine at least one category associated with each video frame.

More noise exists in the classification result outputted by the image classifier, that is, it is unable to continuously identify the same category sequentially. Therefore, a temporal smoothing processing is required to be performed on the classification result for the image corresponding to each video frame, to determine at least one category associated with each video frame.

It will be understood that at least one category herein is at least one of multiple categories that can be determined by the selected image classifier.

That is, if multiple categories that can be determined by the image classifier are considered as a category set, at least one category associated with each video frame obtained by the temporal smoothing processing may constitute a subset of the category set.

In operation S140, the adjacent video frames of the same category are grouped into a video segment, to obtain multiple video segments.

In the embodiment of the present disclosure, a classification category instance in the adjacent video frames of the same category may be considered to continuously appear in the above continuous video frames, and the video frames are categorized into the video segment of the classification instance in the to-be-processed video. If the same video frame belongs to different categories, the video frame is categorized into different video segments corresponding to the categories.

In some embodiments of the present disclosure, an image is tagged by an image classifier. A classification model is trained by using pre-tagged image data, to automatically segment a video, thereby reducing the burden of collecting and tagging training data in a video understanding task. Image recognition is used to tag objects having multiple semantics, and a video is tagged according to objects having rich semantic. Images corresponding to multiple video frames collected in a to-be-processed video sequentially are classified, and the adjacent video frames of the same category are grouped into a video segment. Therefore, different categories of instances overlapping or crossing in the video are classified, and the starting and ending positions of different categories of instances in the video are determined.

Figure 2:
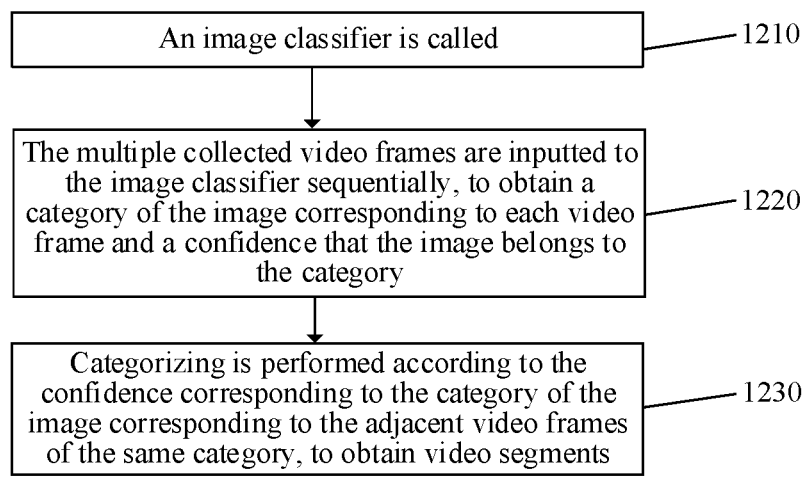
FIG. 2 is a flowchart of classifying an image corresponding to each of multiple collected video frames according to some embodiments of the present disclosure.

FIG. 2 is a flowchart of classifying the image corresponding to each of multiple collected video frames according to some embodiments of the present disclosure. As shown in FIG. 2, in operation S1210, an image classifier is called. The image classifier may be a classifier based on SVM, CNN, etc. For any inputted image, an output of the image classifier is a category obtained by image classification, and a confidence that the image belongs to the category.

In operation S1220, the multiple collected video frames are inputted to the image classifier sequentially, to obtain a category of the image corresponding to each video frame and a confidence that the image belongs to the category.

The number of the collected video frames is M, and the collected M (M is a positive integer greater than or equal to 2) video frames are input into the image classifier sequentially. For example, the image classifier may discriminate N (N is a positive integer greater than or equal to 2) categories, and the image classifier outputs an N-dimensional vector for any inputted video frame. The i-th dimensional ($i \in \{1, 2, \ldots, N\}$) vector indicates a confidence that the image is classified into the i-th category by the image classifier. For example, in operation S110, 15 video frames are extracted, and the image classifier may discriminate 7 categories, such as a category of sky, a category of bird, a category of ocean, a category of flower, a category of tree, a category of mountain, and a category of grassland. Then, after the image classifier is used to classify the image corresponding to each of the multiple video frames, a frame classification confidence matrix of 15*7 may be obtained. The j-th row ($j \in \{1, 2, \ldots, 15\}$) in the matrix denotes a classification vector of the image classifier for the j-th frame.

In operation S1230, categorizing is performed according to the confidence corresponding to the category of the image corresponding to the adjacent video frames of the same category, to obtain video segments.

Figure 3:
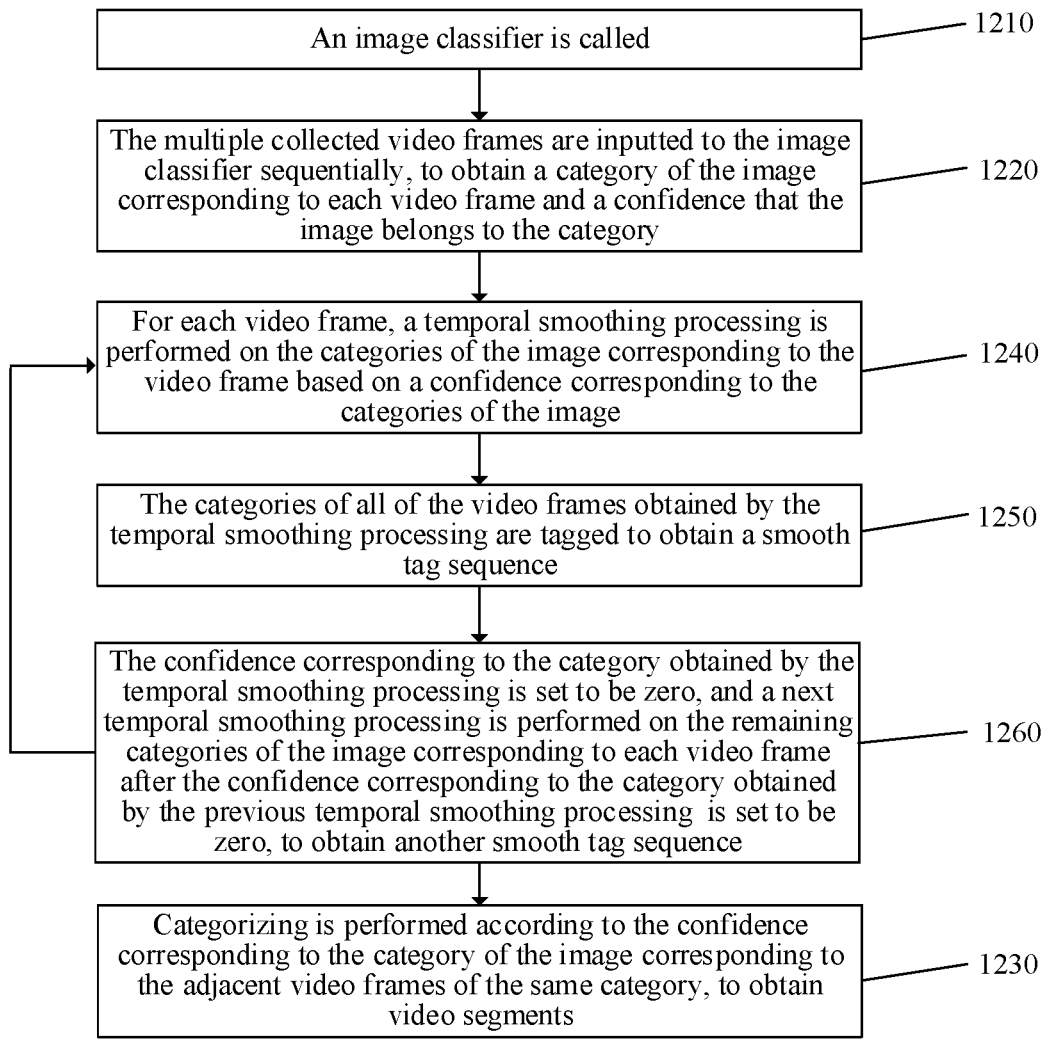
FIG. 3 is a flowchart of classifying an image corresponding to each of multiple collected video frames according to some embodiments of the present disclosure.

FIG. 3 is a flowchart of classifying an image corresponding to each of multiple collected video frames according to some embodiments of the present disclosure. As shown in FIG. 3, after the operation that the image corresponding to each of the multiple collected video frames is classified, operations S1240, S1250 and S1260 are further included.

In operation S1240, for each video frame, a temporal smoothing processing is performed on the categories of the image corresponding to the video frame based on confidences corresponding to the categories of the image.

In operation S1250, the categories of all of the video frames obtained by the temporal smoothing processing are tagged to obtain a smooth tag sequence.

In operation S1260, the confidence corresponding to the category obtained by the temporal smoothing processing is set to be zero, and a next temporal smoothing processing is performed on the remaining categories of the image corresponding to each video frame after the confidence corresponding to the category obtained by the previous temporal smoothing processing is set to be zero, to obtain another smooth tag sequence.

After a temporal smoothing processing is performed to determine a classified smooth tag sequence, a confidence corresponding to the category of the image obtained by the temporal smoothing processing is set to be zero, and a next temporal smoothing processing is performed on the remaining categories of the image corresponding to each video frame, until a predetermined number of smooth tag sequences are determined. The predetermined number may be 4, 5 or other values according to needs. A smooth tag sequence may be obtained each time the maximum objective function is solved.

The above performing temporal smooth processing is repeated until a predetermined number of smooth tag sequences are determined.

In some embodiments of the present disclosure, a temporal smoothing processing is performed on the category of the image corresponding to each video frame, to obtain a smooth tag sequence. When the temporal smoothing processing is performed on the category of the image corresponding to each video frame, normalization processing may be performed based on the confidence corresponding to each category of the image corresponding to the video frame and a cumulative multiplication term between predetermined state transition matrices, a confidence satisfying the maximum probability condition is determined, and the category corresponding to the confidence satisfying the maximum probability condition is determined as the category obtained by the temporal smoothing processing. For example, conditional random fields (CRF) may be constructed for the temporal smoothing processing. For example, a linear chain CRF model is constructed, and categories in all of the video frames of the to-be-processed video obtained by the temporal smoothing processing are tagged to obtain a smooth tag sequence. In an example, the image classifier is used to construct an observation sequence X for vectors of classification results for the images corresponding to all of video frames, and a temporal smoothing processing is performed on the observation sequence X, where X is a matrix of M*N, M is the number of multiple video frames, N is the number of categories that can be discriminated by the image classifier, and X(j,i) indicates the confidence that the j-th frame is classified into the i-th category. The smooth tag sequence Y is determined after the temporal smoothing processing. Y is an M-dimensional vector, $Y=\{y_1, y_2, \ldots, y_M\}$, and $y_m \in \{C_1, C_2, \ldots C_N\}$, ($m \in \{1, 2, \ldots, M\}$), where $C_1, C_2, \ldots, C_N$ denotes constants representing the first, second, ..., N-th categories, respectively. $y_m$ is set to be $C_n$ ($n \in \{1, 2, \ldots, N\}$), and indicates that the category outputted for the m-th frame is the n-th category in a result of the current smoothing. The conditional probability distribution P(y|x) of the linear chain CRF model and the observation sequence X are given, and a sequence, that is, the smooth tag sequence $Y=\{y_1, y_2, \ldots, y_M\}$, outputted when a conditional probability is maximized is calculated. For example, assuming that the number of calculating the smooth tag sequence is 4, smooth tag sequences Y1, Y2, Y3, and Y4 are obtained after 4 operations.

$$P(Y|X) = \frac{1}{Z_{(x)}} \prod_{m=1}^{M} \exp(p_m + W_{y_{m-1} \cdot y_m})$$

In the above formula, P(Y|X) denotes a conditional probability function, a calculation result of the cumulative multiplication term denotes a probability score of the smooth tag sequence Y, $p_m$ denotes a confidence that the image classifier classifies the m-th frame into the $y_m$ category (assuming that $y_m = C_n$, that is, the n-th category), $W \in R^{N \times N}$ denotes a state transition matrix, and denotes a normalization factor. When W and $p_m$ are known, a conditional probability P(Y|X) of any sequence Y may be solved by the above formula.

In some embodiments of the present disclosure, a smooth tag sequence Y when the above conditional probability P(Y|X) is maximum may be solved by using, for example, a Viterbi algorithm.

In some embodiments of the present disclosure, the state transition matrix W may be obtained by a gradient descent method, a Newton method or a quasi-Newton method on the one hand. On the other hand, the state transition matrix W may also be obtained by a unit matrix.

In some embodiments of the present disclosure, the predetermined state transition matrix has a predetermined multiple relationship with the unit matrix, and the predetermined multiple is determined according to a smoothing degree. For example, if the state transition matrix W is set to be α times of the unit matrix, the smoothing degree may be controlled by regulating a value of α. That is, with an increase of α, a result of the smooth tag sequence obtained by a temporal smoothing processing becomes smoother. For example, if the large number of video frames are collected from the to-be-processed video, a large value of a is selected correspondingly. On the contrary, if the small number of video frames are collected from the to-be-processed video, a small value of a is selected correspondingly. In some embodiments of the present disclosure, the predetermined multiple a may be determined according to an experimental test.

In some embodiments of the present disclosure, a temporal smoothing processing is performed on the category of the image corresponding to each video frame. In addition to the above-described linear chain CRF modeling strategy, a fully-connected CRF modeling strategy may be selected as the solution of a single smooth tag sequence.

Exemplarily, a fully-connected CRF model may be constructed, and a smooth tag sequence $Y=\{y_1, y_2, \ldots, y_M\}$ after smoothing may be obtained by minimizing the following energy function. $y_m$ in the smooth tag sequence has the same meaning as in the linear chain CRF model and will not be repeated here.

$$E(Y) = \sum_{i=1}^{M} (\ln g(p_i)) + \omega \sum_{i \neq j}^{M} \mu(y_i, y_j) \exp\left(-\frac{\|i-j\|}{2\sigma^2}\right)$$

In the above formula, $y_i$ ($y_i \in \{C_1, C_2, \ldots, C_N\}$) represents a category tag of the i-th frame of the to-be-processed video, $p_i$ denotes a confidence that the image classifier classifies the i-th frame into the $y_i$ category, $\mu(y_i, y_j)=0$ when $y_i=y_j$; and $\mu(y_i, y_j)=1$ when $y_i \neq y_j$. ω and σ denote constant parameters that can be adjusted with a validation data set. The three-dimensional CRF DenseCRF algorithm may be used to calculate the above energy minimization problem, and further obtain the smooth tag sequence Y after smoothing.

In some embodiments of the present disclosure, a mean value of adjacent confidences corresponding to the same category in the predetermined number of smooth tag sequences is taken as a confidence corresponding to the category of images corresponding to the adjacent video frames of the same category.

In an example, multiple category tags for each video frame are scanned sequentially, and the mean value of confidences that all adjacent frames of the same category belongs to the category is calculated as a confidence corresponding to a classified segment for the category. For the multiple categories of in the to-be-processed video, the above performing the temporal smoothing processing is repeated until segments corresponding to all categories are determined. As compared with the traditional video segmentation strategy in which only multiple category tags corresponding to the highest confidence are extracted, in some embodiments of the present disclosure, categories corresponding to all confidences are retained, and the temporal smoothing processing is performed multiple times, thereby preserving rich and reasonable semantics.

FIG. 4 is a schematic diagram of categorizing the multiple video frames into video segments according to a smooth tag sequence in the video processing method according to some embodiments of the present disclosure. Referring to FIG. 4, FIG. 4 shows a classification category tag, of a video frame of a to-be-processed video, outputted after a temporal smoothing processing and a confidence statistic corresponding to the categories. The lateral direction represents 15 consecutive frames in the video, and the vertical direction represents four smooth tag sequences obtained when the number of calculating the smooth tag sequences is 4. That is, each time the smooth tag sequence Y is calculated, values in a row in FIG. 4 are obtained correspondingly. The linear chain CRF modeling strategy or the fully-connected CRF modeling strategy in the above embodiment are used to calculate Y.

Exemplarily, a category tag result of the j-th (j=1, 2, . . . , 15) frame in the i-th (i=1, 2, 3, 4) smooth tag sequence Y obtained by the temporal smoothing processing, and a confidence corresponding to the category of the image corresponding to the j-th frame outputted by the image classifier, are recorded at the i-th row and the j-th column in FIG. 4. That is, after the image classifier classifies an image of each video frame of the multiple video frames, confidences in a frame classification confidence matrix of 15*7 are obtained.

A mean value of confidences corresponding to the same category in 15 consecutive frames belong to the category is taken as the confidence that a video segment corresponds to the category. For example, the sky appears in the first frame to the sixth frame, the confidences corresponding to the first frame to the sixth frame are 0.7, 0.85, 0.1, 0.6, 0.5 and 0.5, respectively, and a confidence corresponding to the sky category of the first frame to the sixth frame is represented as (0.7+0.85+0.1+0.6+0.5+0.5)/6=0.540. A confidence for the following categories is calculated in the same manner.

According to the results shown in FIG. 4, the seven category tags and the confidences corresponding to the seven category tags in the foregoing example are described as follows:

Category 1: sky, which starts from the first frame and ends at the sixth frame, and has a confidence of 0.540.

Category 2: grassland, which starts from the seventh frame and ends at the fifteenth frame, and has a confidence of 0.384.

Category 3: bird, which starts from the first frame and ends at the fourth frame, and has a confidence of 0.223.

Category 4: mountain, which starts from the fifth frame and ends at the fifteenth frame, and has a confidence of 0.266.

Category 5: ocean, which starts from the first frame and ends at the fifth frame, and has a confidence of 0.078.

Category 6: flower, which starts from the sixth frame and ends at the fifteenth frame, and has a confidence of 0.282.

Category 7: tree, which starts from the first frame and ends at the fifteenth frame, and a confidence of 0.031.

Figure 5:
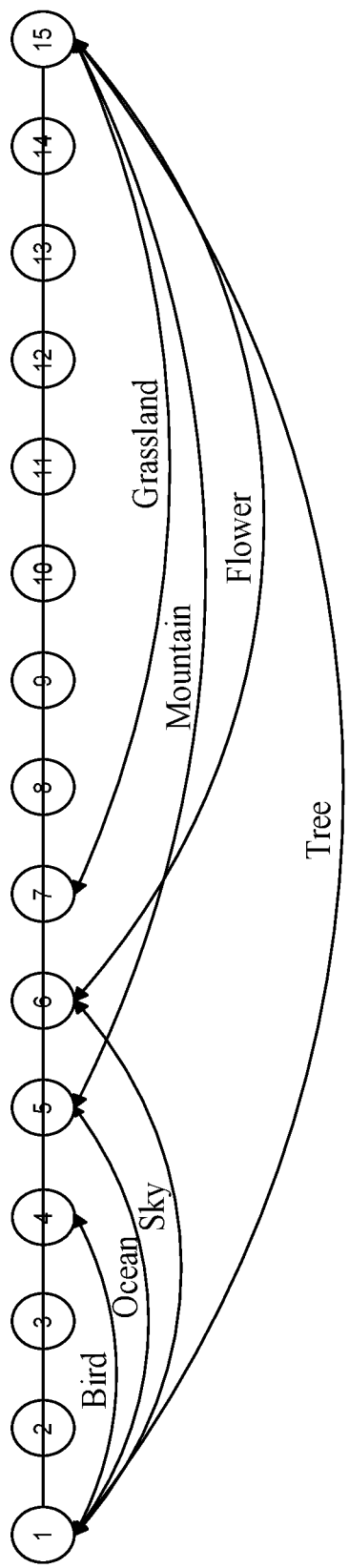
FIG. 5 is a schematic diagram of a result of categorizing the multiple video frames into video segments according to a smooth tag sequence in the video processing method according to some embodiments of the present disclosure.

FIG. 5 is a schematic diagram of a result of categorizing the multiple video frames into video segments according to a smooth tag sequence in a video processing method according to some embodiments of the present disclosure. FIG. 5 shows a starting position and an ending position of the each category of seven categories corresponding to the first frame, the second frame, . . . , and the fifteenth frame in the above example.

In some embodiments of the present disclosure, a video segment corresponding to a confidence greater than a predetermined confidence threshold is taken as a final video segment. Different confidence thresholds can be selected for different categories correspondingly. In the present embodiment, the confidence thresholds for all categories are exemplarily selected to be 0.1, and the category segment corresponding to a confidence less than 0.1 is removed. That is, the video in the fifth category (flower) corresponding to a confidence of 0.078 and the video in the seventh category (ocean) corresponding to a confidence of 0.031 are deleted, and other video segments are remained. In another example, different thresholds may be set for the different categories, and an optimal threshold may generally be calculated using the validation set.

A starting time and an ending time of the video segment of each category in the video are calculated by a starting frame number and an ending frame number of the video segment, and a video segment corresponding to the category is obtained. That is, the video in the above example includes a total of five categories of video segments, and the starting frames and the ending frame of each category of video segment are described as follows:

Category 1: sky, which starts from the first frame and ends at the sixth frame.

Category 2: grassland, which starts from the seventh frame and ends at the fifteenth frame.

Category 3: bird, which starts from the fifth frame and ends at the fourth frame.

Category 4: mountain, which starts from the fifth frame and ends at the fifteenth frame.

Category 5: flower, which starts from the sixth frame and ends at the fifteenth frame.

It can be seen from the above statistical results that, with the method of some embodiments of the present disclosure, the categories corresponding to all confidences are preserved before a temporal smoothing processing, and in a case that different categories of video segments overlap or cross at least partially sequentially, the video segments can be obtained by categorizing. That is, when a video frame belongs to multiple video categories, the starting position and the ending position of an instance of each category may be separately outputted. As compared with the traditional video segmentation strategy, in which only multiple category tags corresponding to the highest confidence are extracted, in some embodiments of the present disclosure, categories corresponding to all confidence values are retained, and the temporal smoothing processing is performed by the CRF model multiple times, thereby preserving rich and reasonable semantics.

In some embodiments of the present disclosure, a video may be segmented according to a line segment detection method to obtain video segments. In an example, a grayscale image is constructed according to the category of the image corresponding to each video frame, and the confidence corresponding to each category. The grayscale image includes a horizontal axis coordinate and a longitudinal axis coordinate. The horizontal axis coordinate of the image denotes the confidence corresponding to the category, and the longitudinal axis coordinate denotes a sequence of the video frames. The line segment detection method, such as Hough line detection method, an endpoint expansion line segment detection method or an LSD line segment detection method, is used to detect a longitudinal straight line of the grayscale image. Each longitudinal straight line is a video segment corresponding to one category. Starting and ending coordinates of the longitudinal axis of the longitudinal straight line correspond to starting and ending frames of the video segment, and the coordinate of the horizontal axis of the longitudinal straight line corresponds to the category of the video segment.

Based on a similar concept, a video processing device is further provided according to some embodiments of the present disclosure.

It can be understood that, for realizing the functions, the video processing device provided according to the embodiment of the present disclosure includes hardware structures and/or software portions which execute each function. In combination with units and algorithm steps of each example disclosed in the embodiment of the present disclosure, the embodiment of the present disclosure may be implemented by hardware or a combination of the hardware and computer software. Whether a function is executed by the hardware or in a manner of driving the hardware with the computer software depends on specific applications and design constraints of the technical solutions. For each particular application, those skilled in the art can use different methods for implementing the described functions, but such implementation should not be considered to be beyond the scope of the technical solution of the embodiment of the present disclosure.

Figure 6:
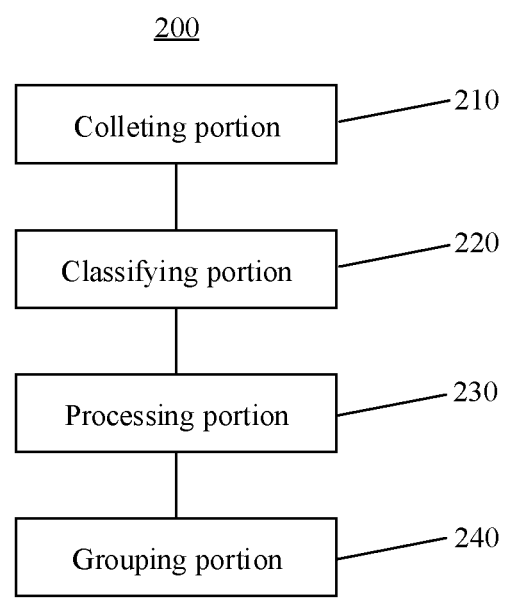
FIG. 6 is a block diagram of a video processing device according to some embodiments of the present disclosure.

FIG. 6 is a block diagram of a video processing device according to some embodiments of the present disclosure. Referring to FIG. 6, the device 200 includes a collecting portion 210, a classifying portion 220, a processing portion 230, and a grouping portion 240.

The collecting portion 210 is configured to collect multiple video frames from a to-be-processed video sequentially.

The classifying portion 220 is configured to classify an image corresponding to each of the multiple video frames to obtain a classification result.

The processing portion 230 is configured to perform a temporal smoothing processing on the classification result for the image corresponding to each video frame, to determine at least one category associated with each video frame.

The grouping portion 240 is configured to group the adjacent video frames of the same category into the same video segment, to obtain multiple video segments. If the same video frame belongs to different categories, the video frame is categorized into different video segments of the categories corresponding to the video frame.

In some embodiments, the classifying portion 220 classifies an image corresponding to each of the multiple video frames to obtain a classification result in the following manners. An image classifier is called. An input of the image classifier is an image, and an output of the image classifier is a confidence corresponding to multiple categories. The grouping portion 240 groups the adjacent video frames of the same category into a video segment to obtain multiple video segments in the following manners. The adjacent video frames of the same category are determined according to at least one category of an image corresponding to each video frame and the confidence corresponding to the category of the image, to categorize the multiple video frames into the multiple video segments.

In some embodiments, the processing portion 230 performs a temporal smoothing processing on the classification result for the image corresponding to each video frame to determine at least one category associated with the video frame in the following manners. A frame classification confidence matrix of the multiple collected video frames is constructed according to the confidences corresponding to the multiple categories outputted by the image classifier for each video frame. A temporal smoothing processing is performed based on the frame classification confidence matrix, to output a smooth tag sequence. The smooth tag sequence is a multi-dimensional vector. A value of each component in the multi-dimensional vector represents a category tag of each video frame outputted in the performed temporal smoothing processing. The above performing temporal smoothing processing is repeated until a predetermined number of smooth tag sequences are determined. The at least one category associated with each video frame is selected from the multiple categories by using the confidences in the predetermined number of smooth tag sequences.

In some embodiments, the processing portion 230 performs a temporal smoothing processing once based on the frame classification confidence matrix to output a smooth tag sequence in the following manners. A linear chain CRF model is constructed, and a smooth tag sequence which satisfies a maximum probability condition is determined by using the linear chain CRF model.

In some embodiments, the processing portion 230 determines a smooth tag sequence which satisfies a maximum probability condition by using the linear chain CRF model in the following manners. Normalization processing is performed based on a frame classification confidence matrix and a predetermined state transition matrix. The predetermined state transition matrix has a predetermined multiple relationship with the unit matrix, and the predetermined multiple is determined according to a smoothing degree.

In some embodiments, the processing portion 230 performs a temporal smoothing processing based on the frame classification confidence matrix to output a smooth tag sequence in the following manners. A fully-connected CRF model is constructed, and a smooth tag sequence is determined by the fully-connected CRF model based on a minimized energy function.

In some embodiments, the processing portion 230 determines the confidence corresponding to the category of the images, which correspond to the adjacent video frames of the same category, by using the confidences in the predetermined number of smooth tag sequences in the following manners. A mean value of the adjacent confidences corresponding to the same category in the predetermined number of smooth tag sequences is taken as a confidence corresponding to the category of images corresponding to the adjacent video frames of the same category.

In some embodiments, after the adjacent video frames of the same category are grouped into a video segment, the grouping portion 240 is further configured to: determine a confidence corresponding to each of the video segments obtained by categorizing; and take a video segment corresponding to the confidence greater than a predetermined threshold as a final video segment.

In some embodiments, the grouping portion 240 determines the adjacent video frames of the same category according to at least one category of the image corresponding to each video frame and the confidence corresponding to the at least one category, to categorize the multiple video frames into the multiple video segments, in the following manners. A frame classification confidence matrix of the multiple collected video frames is constructed according to the confidence corresponding to the multiple categories outputted by the image classifier for each video frame. A grayscale image is constructed based on the frame classification confidence matrix. The grayscale image includes a horizontal axis coordinate and a longitudinal axis coordinate. The horizontal axis coordinate represents a confidence corresponding to the category, and the longitudinal axis coordinate represents a sequence of the video frames. A longitudinal straight line of the grayscale image is detected by using a line segment detection method, and the video is segmented into the video segment according to the longitudinal straight line. Starting and ending coordinates of the longitudinal axis of the longitudinal straight line correspond to starting and ending frames of the video segment, and the coordinate of the horizontal axis of the longitudinal straight line corresponds to the category of the video segment.

Figure 7:
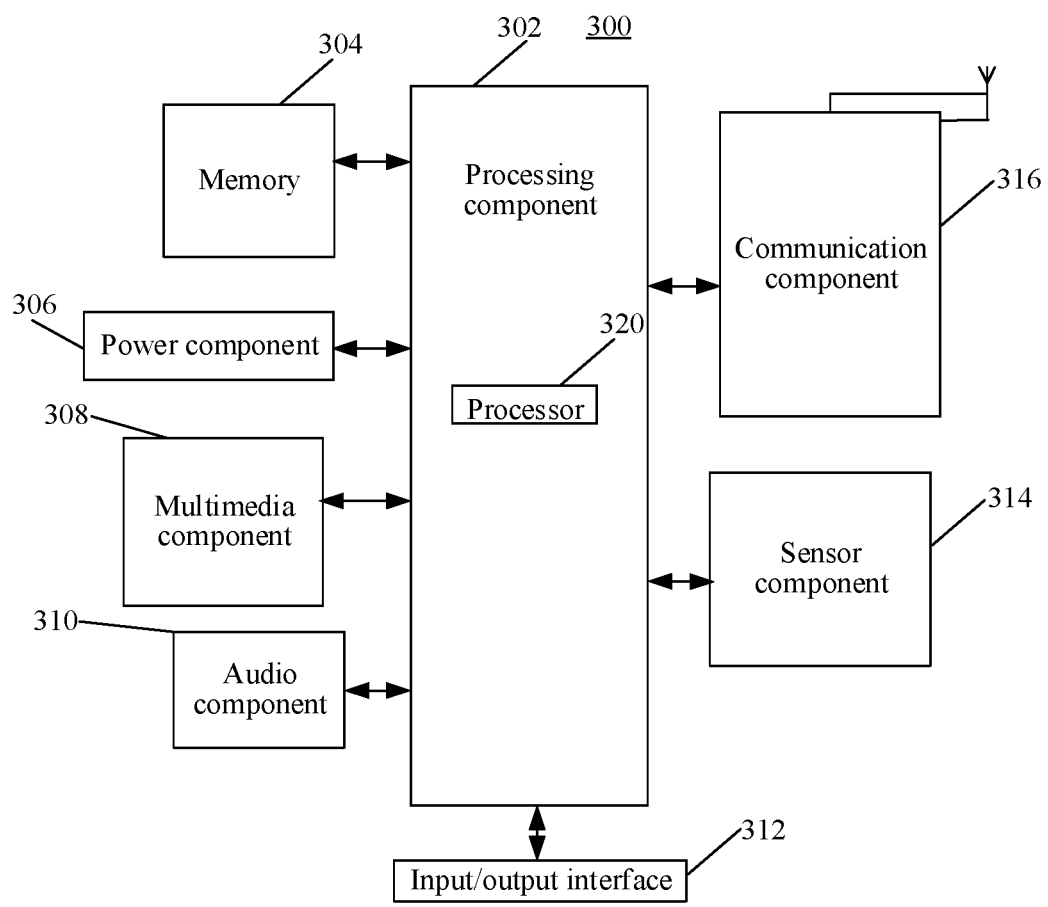
FIG. 7 is a block diagram of a video processing device according to some embodiments of the present disclosure.

FIG. 7 is a block diagram of a video processing device 300 according to some embodiments. For example, the device 300 may be a mobile phone, a computer, a digital broadcast terminal, a messaging device, a gaming console, a tablet, a medical device, exercise equipment, a personal digital assistant, and the like.

Referring to FIG. 7, the device 300 may include one or more of the following components: a processing component 302, a memory 304, a power component 306, a multimedia component 308, an audio component 310, an input/output (I/O) interface 312, a sensor component 314, and a communication component 316.

The processing component 302 is typically configured to control overall operations of the terminal 300, such as the operations associated with display, telephone calls, data communications, camera operations, and recording operations. The processing component 302 may include one or more processors 320 to execute instructions to perform all or a part of the operations in the abovementioned method. Moreover, the processing component 302 may include one or more portions which facilitate interaction between the processing component 302 and other components. For instance, the processing component 302 may include a multimedia portion to facilitate interaction between the multimedia component 308 and the processing component 302.

The memory 304 is configured to store various types of data to support the operation of the device 300. Examples of such data include instructions for any application programs or methods operated on the device 300, contact data, phonebook data, messages, pictures, video, etc. The memory 304 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 306 is configured to provide power for various components of the device 300. The power component 306 may include a power management system, one or more power supplies, and other components associated with generation, management and distribution of power for the device 300.

The multimedia component 308 may include a screen for providing an output interface between the device 300 and a user. In some examples, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some examples, the multimedia component 308 may include a front camera and/or a rear camera. The front camera and/or the rear camera may receive external multimedia data when the device 300 is in an operation mode, such as a photographing mode or a video mode. Each of the front camera and the rear camera may be a fixed optical lens system or have focusing and optical zooming capabilities.

The audio component 310 is configured to output and/or input an audio signal. For example, the audio component 310 includes a Microphone (MIC), and the MIC is configured to receive an external audio signal when the terminal 300 is in the operation mode, such as a call mode, a recording mode and a voice recognition mode. The received audio signal may further be stored in the memory 304 or transmitted through the communication component 316. In some examples, the audio component 310 may further include a speaker configured to output the audio signal.

The I/O interface 312 is configured to provide an interface between the processing component 302 and a peripheral interface portion, and the peripheral interface portion may be a keyboard, a click wheel, a button and the like. The button may include, but not limited to: a home button, a volume button, a starting button and a locking button.

The sensor component 314 may include one or more sensors configured to provide status assessment in various aspects for the terminal 300. For instance, the sensor component 314 may detect an on/off status of the device 300 and relative positioning of components, such as a display and small keyboard of the device 300, and the sensor component 314 may further detect a change in a position of the device 300 or a component of the device 300, presence or absence of contact between the user and the device 300, orientation or acceleration/deceleration of the device 300 and a change in temperature of the terminal 300. The sensor component 314 may include a proximity sensor configured to detect presence of an object nearby without any physical contact. The sensor component 314 may also include a light sensor, such as a Complementary Metal Oxide Semiconductor (CMOS) or Charge Coupled Device (CCD) image sensor, configured for use in an imaging APP. In some examples, the sensor component 314 may also include an acceleration sensor, a gyroscope sensor, a magnetic sensor, a pressure sensor or a temperature sensor.

The communication component 316 is configured to facilitate wired or wireless communication between the device 300 and other equipment. The device 300 may access a communication-standard-based wireless network, such as a Wireless Fidelity (Wi-Fi) network, a $2^{nd}$-Generation (2G), $3^{rd}$-Generation (3G), 4th-Generation (4G), or $5^{th}$-Generation (5G) network or a combination thereof. In some embodiments of the present disclosure, the communication component 316 is configured to receive a broadcast signal or broadcast associated information from an external broadcast management system through a broadcast channel. In some embodiments of the present disclosure, the communication component 316 may further include a Near Field Communication (NFC) portion to facilitate short-range communication. For example, the NFC portion may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the terminal 300 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium including an instruction, such as the memory 304 including an instruction, and the instruction may be executed by the processor 320 of the device 300 to implement the abovementioned method. For example, the non-transitory computer-readable storage medium may be a ROM, a Compact Disc Read-Only Memory (CD-ROM), a magnetic tape, a floppy disc, an optical data storage device and the like.

According to a non-transitory computer-readable storage medium, an instruction in the storage medium is executable by a processor of a mobile terminal to enable the mobile terminal to execute any video processing method as described above.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

In some embodiments, the display screen can implement additional operations or steps of the methods described above, such as displaying final or intermediate video classification results to users and/or operators, or displaying recommended videos to users based on the classification results.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A video processing method, comprising:
   collecting a plurality of video frames sequentially from a to-be-processed video;
   for each of the plurality of video frames, classifying an image corresponding to the video frame to obtain a classification result;
   performing a temporal smoothing processing on the classification results for the images corresponding to all of the video frames, to determine at least one category associated with each of the video frames; and
   grouping the adjacent video frames of a same category into a video segment, to obtain a plurality of video segments,
   wherein in a case that a same video frame belongs to different categories, the video frame is categorized into different video segments of the categories corresponding to the video frame,
   wherein for each of the plurality of video frames, the classifying an image corresponding to each of the plurality of video frames to obtain a classification result comprises:
   calling an image classifier, with an input of the image classifier being the image, and an output of the image classifier being confidences corresponding to a plurality of categories, and
   wherein the performing a temporal smoothing processing on the classification results for the images corresponding to all of the video frames, to determine at least one category associated with each of the video frames comprises:
   constructing a frame classification confidence matrix of the plurality of collected video frames according to the confidences corresponding to the plurality of categories outputted by the image classifier for each video frame;
   performing a temporal smoothing processing based on the frame classification confidence matrix, to output a smooth tag sequence, with the smooth tag sequence being a multi-dimensional vector, a value of each component in the multi-dimensional vector representing a category tag outputted for the video frame in the temporal smoothing processing;
   repeating the performing the temporal smoothing processing until a predetermined number of smooth tag sequences are determined; and
   determining the at least one category associated with each video frame from the plurality of categories by using the confidences in the predetermined number of smooth tag sequences.

2. The video processing method of claim 1, wherein the grouping the adjacent video frames of a same category into a video segment, to obtain a plurality of video segments comprises:
   determining the adjacent video frames of the same category according to at least one category of the image corresponding to each video frame and a confidence corresponding to the at least one category, to categorize the plurality of video frames into the plurality of video segments.

3. The video processing method of claim 1, wherein the performing a temporal smoothing processing based on the frame classification confidence matrix to output a smooth tag sequence comprises:
   constructing a linear chain Conditional Random Field (CRF) model; and
   determining, by using the linear chain CRF model, a smooth tag sequence that satisfies a maximum probability condition.

4. The video processing method of claim 3, wherein the determining, by using the linear chain CRF model, a smooth tag sequence that satisfies a maximum probability condition comprises:
   performing normalization processing based on the frame classification confidence matrix and a predetermined state transition matrix,
   wherein the predetermined state transition matrix has a predetermined multiple relationship with a unit matrix, and the predetermined multiple is determined according to a smoothing degree.

5. The video processing method of claim 1, wherein the performing a temporal smoothing processing based on the frame classification confidence matrix to output a smooth tag sequence comprises:
   constructing a fully-connected Conditional Random Field (CRF) model; and
   determining, by using the fully-connected CRF model, a smooth tag sequence based on a minimized energy function.

6. The video processing method of claim 1, wherein after the determining the at least one category associated with each video frame from the plurality of categories by using the confidences in the predetermined number of smooth tag sequences, the method further comprises:
    taking a mean value of the adjacent confidences, corresponding to a same category, in the predetermined number of smooth tag sequences as a confidence corresponding to the category of the images corresponding to the adjacent video frames of the same category.

7. The video processing method of claim 2, wherein after the grouping the adjacent video frames of a same category into a video segment, the method further comprises:
    determining a confidence corresponding to each of the video segments obtained by the categorizing; and
    taking the video segment corresponding to the confidence greater than a predetermined threshold as a final video segment.

8. The video processing method of claim 2, wherein the determining the adjacent video frames of the same category according to at least one category of the image corresponding to each video frame and a confidence corresponding to the at least one category, to categorize the plurality of video frames into the plurality of video segments comprises:
    constructing a frame classification confidence matrix of the plurality of collected video frames according to the confidences corresponding to the plurality of categories outputted by the image classifier for each video frame;
    constructing a grayscale image based on the frame classification confidence matrix, with the grayscale image comprising a horizontal axis coordinate and a longitudinal axis coordinate, wherein the horizontal axis coordinate represents confidences corresponding to the categories, and the longitudinal axis coordinate represents a sequence of the video frames;
    detecting a longitudinal straight line of the grayscale image by using a line segment detection method; and
    categorizing the plurality of video frames into the video segments according to the longitudinal straight line, wherein starting and ending coordinates in a longitudinal axis of the longitudinal straight line correspond to starting and ending frames of the video segment, and a coordinate in a horizontal axis of the longitudinal straight line corresponds to a category of the video segment.

9. A video processing device, comprising:
    a processor;
    a memory configured to store an instruction executable by the processor; and
    a processor is configured to:
    collect a plurality of video frames sequentially from a to-be-processed video;
    for each of the plurality of video frames, classify an image corresponding to the video frame to obtain a classification result;
    perform a temporal smoothing processing on the classification results for the images corresponding to all of the video frames, to determine at least one category associated with each of the video frames; and
    group the adjacent video frames of a same category into a video segment, to obtain a plurality of video segments,
    wherein if a same video frame belongs to different categories, the video frame is categorized into different video segments of the categories corresponding to the video frame,
    wherein the processor is further configured to:
    call an image classifier, with an input of the image classifier being the image, and an output of the image classifier beano confidences corresponding to a plurality of categories, and
    wherein the processor is further configured to:
    construct a frame classification confidence matrix of the plurality of collected video frames according to the confidences corresponding to the plurality of categories outputted by the image classifier for each video frame;
    perform a temporal smoothing processing based on the frame classification confidence matrix, to output a smooth tag sequence, with the smooth tag sequence being a multi-dimensional vector, a value of each component in the multi-dimensional vector representing a category tag outputted for the video frame in the temporal smoothing processing;
    repeat the performing a temporal smoothing processing until a predetermined number of smooth tag sequences are determined; and
    determine the at least one category associated with each video frame from the plurality of categories by using the confidences in the predetermined number of smooth tag sequences.

10. The video processing device of claim 9, wherein the processor is further configured to:
    determine the adjacent video frames of the same category according to at least one category of the image corresponding to each video frame and a confidence corresponding to the at least one category, to categorize the plurality of video frames into the plurality of video segments.

11. The video processing device of claim 9, wherein the processor is further configured to:
    construct a linear chain Conditional Random Field (CRF) model; and
    determine, by using the linear chain CRF model, a smooth tag sequence that satisfies a maximum probability condition.

12. The video processing device of claim 11, wherein the processor is further configured to:
    perform normalization processing based on the frame classification confidence matrix and a predetermined state transition matrix,
    wherein the predetermined state transition matrix has a predetermined multiple relationship with a unit matrix, and the predetermined multiple is determined according to a smoothing degree.

13. The video processing device of claim 9, wherein the processor is further configured to:
    construct a fully-connected Conditional Random Field (CRF) model; and
    determine, by using the fully-connected CRF model, a smooth tag sequence based on a minimized energy function.

14. The video processing device of claim 9, wherein the processor is further configured to:
    take a mean value of the adjacent confidences, corresponding to a same category, in the predetermined number of smooth tag sequences as a confidence corresponding to the category of the images corresponding to the adjacent video frames of the same category.

15. The video processing device of claim 10, wherein after the adjacent video frames of a same category are grouped into a video segment, the processor is further configured to:

determine a confidence corresponding to each of the video segments obtained by the categorizing; and take the video segment corresponding to the confidence greater than a predetermined threshold as a final video segment.

16. The video processing device of claim 10, wherein the processor is further configured to:

construct a frame classification confidence matrix of the plurality of collected video frames according to the confidences corresponding to the plurality of categories outputted by the image classifier for each video frame;

construct a grayscale image based on the frame classification confidence matrix, with the grayscale image comprising a horizontal axis coordinate and a longitudinal axis coordinate, wherein the horizontal axis coordinate represents confidences corresponding to the categories, and the longitudinal axis coordinate represents a sequence of the video frames;

detect a longitudinal straight line of the grayscale image by using a line segment detection method; and categorize the plurality of video frames into the video segments according to the longitudinal straight line, wherein starting and ending coordinates in a longitudinal axis of the longitudinal straight line correspond to starting and ending frames of the video segment, and a coordinate in a horizontal axis of the longitudinal straight line corresponds to a category of the video segment.

17. A non-transitory computer-readable storage medium having computer executable instructions stored thereon for execution by a processor to enable the processor to implement a video processing method, the method comprising:

collecting a plurality of video frames sequentially from a to-be-processed video;

for each of the plurality of video frames, classifying an image corresponding to the video frame to obtain a classification result;

performing a temporal smoothing processing on the classification result for the image corresponding to the video frame, to determine at least one category associated with the video frame; and grouping the adjacent video frames of a same category into a video segment, to obtain a plurality of video segments, wherein if a same video frame belongs to different categories, the video frame is categorized into different video segments of the categories corresponding to the video frame, wherein the classifying an image corresponding to each of the plurality of video frames to obtain a classification result comprises:

calling an image classifier, with an input of the image classifier being the image, and an output of the image classifier being confidences corresponding to a plurality of categories, and wherein the performing a temporal smoothing processing on the classification results for the images corresponding to all of the video frames, to determine at least one category associated with each of the video frames comprises:

constructing a frame classification confidence matrix of the plurality of collected video frames according to the confidences corresponding to the plurality of categories outputted by the image classifier for each video frame;

performing a temporal smoothing processing based on the frame classification confidence matrix, to output a smooth tag sequence, with the smooth tag sequence being a multi-dimensional vector, a value of each component in the multi-dimensional vector representing a category tag outputted for the video frame in the temporal smoothing processing;

repeating the performing the temporal smoothing processing until a predetermined number of smooth tag sequences are determined; and determining the at least one category associated with each video frame from the plurality of categories by using the confidences in the predetermined number of smooth tag sequences.

18. The non-transitory computer-readable storage medium of claim 17, wherein the grouping the adjacent video frames of a same category into a video segment, to obtain a plurality of video segments comprises:

determining the adjacent video frames of the same category according to at least one category of the image corresponding to each video frame and a confidence corresponding to the at least one category, to categorize the plurality of video frames into the plurality of video segments.

* * * * *